Dec. 20, 1949     W. M. KELLER     2,491,666
WHEEL SLIDE CONTROL DEVICE
Filed Sept. 20, 1946
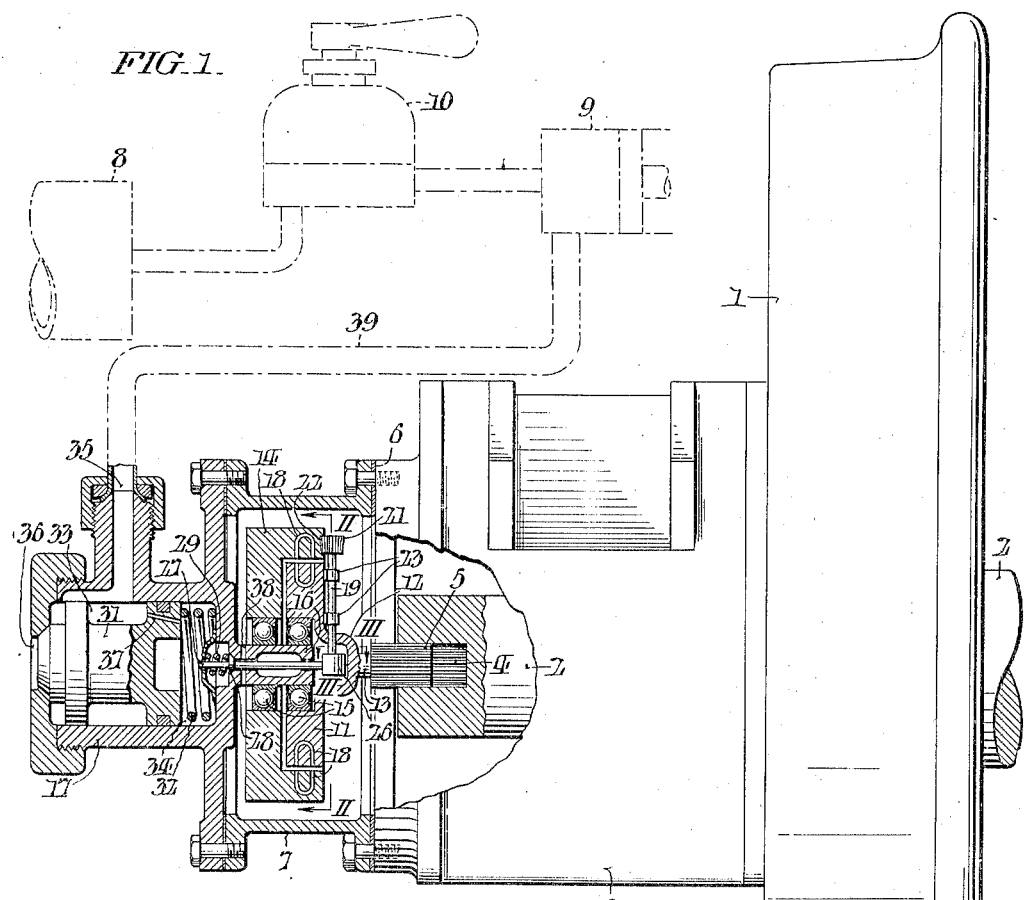
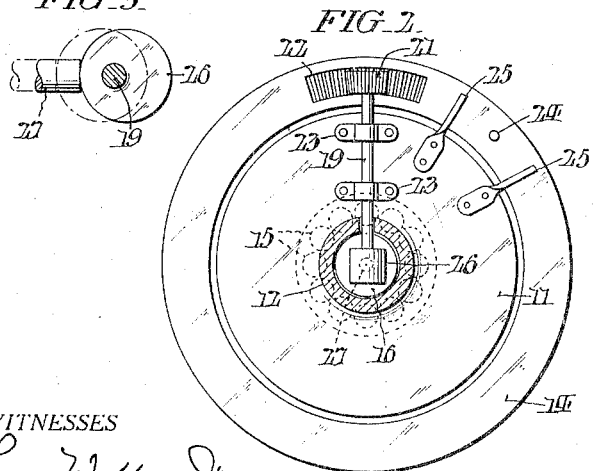
INVENTOR:
William M. Keller,
BY Paul & Paul
ATTORNEYS.

Patented Dec. 20, 1949

2,491,666

UNITED STATES PATENT OFFICE 2,491,666

WHEEL SLIDE CONTROL DEVICE

William M. Keller, Merion, Pa., assignor to The Pennsylvania Railroad Company, Philadelphia, Pa., a corporation of Pennsylvania Application September 20, 1946, Serial No. 698,253

5 Claims. (Cl. 188—181)

This invention relates to wheel slide control devices, and more particularly to a device adapted for use on railroad cars or other vehicles having brakes which are applied by air or the like and where it is desirable to prevent a sudden application of the brakes from causing the wheels to lock and slide with respect to the rails. Such sliding is objectionable because it produces flat areas on the wheels rendering them unsuitable for service and for the further reason that it lessens the force retarding the motion of the vehicle along the track.

The object of the present invention is to provide a slide control device for a railroad car or other vehicle which is adapted to supplement the usual brake system and which is inoperative under normal conditions of acceleration or deceleration but when abnormal deceleration occurs functions automatically to release the braking pressure to a sufficient extent to prevent the wheels from locking and sliding.

A more specific object of the invention is to accomplish the above ends by means of relatively simple and rugged mechanism providing a positive mechanical control, responsive to the action of a rotary inertia element under conditions of excessive deceleration, for governing the operation of a valve connected to the brake system and thereby relieving the excessive braking pressure.

A further object of the invention is to provide a device of the above character which can be readily applied to the axles of conventional railroad vehicles without requiring any radical changes in existing structures.

Other objects and advantages characterizing my present invention will become more apparent from the description of a practical embodiment thereof as applied to a wheel of a railroad car which follows hereinafter having reference to the accompanying drawings. Of the drawings:

Fig. 1 represents an end elevation, partly in cross section of a wheel axle and journal bearing of a railroad car to which the slide control device of this invention has been applied, and showing diagrammatically in dot-and-dash lines certain elements of the brake system of the car;

Fig. 2 represents an enlarged vertical cross section of the same taken as indicated by the arrows II—II of Fig. 1; and Fig. 3 represents an enlarged horizontal cross section of the same taken as indicated by the arrows III—III of Fig. 1.

In the drawings a wheel 1 and the end portion of an axle 2 are shown in association with a conventional journal box 3. At its extremity the axle 2 is internally bored and splined with a keyway 4 adapted to accommodate a gear-shaped key 5 forming a part of the slide control mechanism. The outer end of the journal box terminates in a circular face 6 to which a disk housing 7 is bolted.

In all other respects the wheel axle and journal box may be assumed to follow a conventional design. It may further be assumed that the railroad car is provided with the customary air brake system including a reservoir 8 and a brake cylinder 9 primarily controlled by a brake valve 10 which serves to apply and release a brake (not shown) at the wheel 1 according to the will of an operator in a manner well known to those skilled in the art.

The slide control mechanism includes a rotary element 11 having a hub portion 12 affixed to a shaft 13 upon which the gear-shaped key 5 is mounted. The rotary element 11 is thus positively driven by the wheel axle 2 at the same speed of rotation as that of the wheel 1. By reason of the splined connection between the shaft 13 and the axle 2 there is capacity for limited relative axial movement between the rotary element 11 and the axle 2 so that the former element is unaffected by any endwise thrust of the latter and it is therefore maintained at all times in its proper position within the disk housing.

Disposed adjacent and in surrounding relation to the rotary element 11 there is a rotary inertia element 14 which derives its motion from magnetic attraction between it and the positively driven rotary element 11. Both of the rotary elements 11 and 14 are desirably in the form of circular disks and are mounted to rotate about anti-friction bearings 15 interposed between the rotary disks and a cylindrical stationary element 16 constituting an extension of a valve housing 17 which is bolted to the outer face of the disk housing 7.

A series of permanent magnets 18 are inserted within the rotary disks 11 and 14 and are spaced around the circumference of each disk with the magnets of one disk in registry with the magnets of opposite polarity in the other disk so that the mutual attraction between the two disks will cause the inertia disk 14 to follow the positively driven disk 11. Magnets of sufficient size and number are employed so that the inertia disk 14 will under all normal conditions of acceleration and deceleration rotate at the same speed as that of the positively driven disk 11, but when excessive deceleration occurs as a result of a sudden brake application the inertia of disk 14 will cause it to rotate at a greater speed than that of disk 11 breaking the magnetic interlock and producing a relative angular movement between the two disks. In thus using the term "excessive deceleration" it is intended to refer to a rate of deceleration which would cause a locking and sliding of the wheel if no means were provided for relieving the braking pressure.

As shown in Fig. 2 a shaft 19 is carried by the positively driven disk 11 and has thereon a pinion 21 engaging a rack 22 on the inner face of the inertia disk 14. As long as the inertia disk 14 follows the movement of and is in step with the the positively driven disk 11, and there being no relative angular motion between such disks, shaft 19 will not turn about its axis although it may move bodily in a vertical plane. When, however, the inertia of disk 14, incident to excessive deceleration, is sufficient to overcome the magnetic attraction between disks 11 and 14 a relative angular movement between these disks will result and the pinion 21 will be rotated by the rack 22 with which it meshes causing shaft 19 to rotate within its bearings 23.

Relative angular movement between disks 11 and 14 is limited by stop means consisting of a pin 24 projecting inwardly from the inner face of one of said disks and spaced brackets 25 projecting radially from the inner face of the other disk. When the disks 11 and 14 are magnetically interlocked the pin 24 is located centrally between the brackets 25 but when a relative angular movement occurs between the two disks the pin 24 will engage one of the brackets 25. The brackets 25 are spaced apart a sufficient distance so that shaft 19 may turn about its axis through a substantial angle. Shaft 19 has at one end a cam 26, shown in enlarged detail in Fig. 3, engaging a valve stem 27 of a pilot valve 28, the valve stem being urged by a spring 29 in a direction tending to seat the valve. Under normal conditions pilot valve 28 is closed by the pressure of spring 29, but when as a result of excessive deceleration shaft 19 and cam 26 are rotated about their axes valve stem 27 is forced outwardly by the cam 26 causing the pilot valve 28 to open.

Through mechanism hereinafter described the opening of pilot valve 28 causes a release of the braking pressure applied at wheel 1. In valve housing 17 piston valve 31 is normally maintained by means of a spring 32 and balanced pressures in chambers 33 and 34 in a position in which it obstructs the passage of air, or whatever fluid medium it may be desired to use for the purpose, from an inlet opening 35 to an exhaust outlet 36. A passage 37 in piston valve 31 provides restricted communication between chambers 33 and 34 and equalizes the pressures therein when pilot valve 28 is closed. Upon the opening of pilot valve 28 air from chamber 33 flows through restricted passage 37 to chamber 34 and thence through radial passages 38 to the atmosphere. Under these conditions the pressure differential acting upon piston valve 31 is sufficient to overcome the force of spring 32 causing a movement of the piston valve and permitting air to flow from inlet 35 of valve housing 17 to the atmosphere through exhaust outlet 36. Pilot valve 28 and piston valve 31 thus together serve to control the venting of air from brake cylinder 9 through pipe connection 39.

The operation of the individual elements of the slide control mechanism will be apparent from the above description of the various parts and their functions, but the device as a whole operates in the following manner. Upon the assumption that the vehicle is traveling at a fair rate of speed and that the operator desires to bring it to a stop, he proceeds in the usual manner to shut off the propulsion power and to apply the brakes by moving the handle of the brake valve 10 to that position which gives the degree of brake application which he desires to effect. If this results in a gradual retardation of the vehicle without causing the wheels to decelerate at an excessive rate, the rotary disks 11 and 14 will remain magnetically locked in step with each other and the slide control device will be inoperative in which event the vehicle will be slowed or brought to a stop by the operator's manual control over the degree of pressure of the fluid with which the brake cylinder 9 is charged as a result of his manipulation of the brake valve 10.

If, however, the rate of rotative deceleration as a result of the application of the brakes exceeds the normal or non-sliding rate so that unless the braking pressure is at once modified a sliding of the wheels will result, such excessive deceleration causes the rotary disks 11 and 14 to become magnetically unlocked. In this situation the inertia of disk 14 being sufficient to overcome the magnetic attraction between the rotary disks, disk 14 will rotate at a faster speed than and will overrun disk 11. This results in causing the stop pin 24 to move away from its normal position midway between spaced brackets 25 and to strike one or the other of these brackets, depending upon the direction of travel of the vehicle. Incident to such relative movement between disks 11 and 14 cam 26 will be turned by shaft 19 to a position in which it moves valve stem 27 and opens pilot valve 28. The resulting operation of piston valve 31 causes a release of pressure from brake cylinder 9 through pipe connection 39 to the atmosphere at exhaust outlet 36.

As the braking pressure is thus reduced at wheel 1 the continued rotation of the axle 2 will cause the bracket 25 of disk 11 which has been engaged by stop pin 24 to move away from the stop pin until the disk 14 comes into its original relation to disk 11 whereupon the rotary disks become magnetically locked and rotate in step with each other. Concurrently pilot valve 28 will close and pressure will build up again in the brake cylinder 9 with consequent further application of braking pressure at wheel 1. If such braking pressure again tends to cause the wheel to slide upon re-application of the brakes, the slide control mechanism will again function in the manner previously described. Eventually the vehicle will come to a stop and when a complete stop is effected the rotary disks 11 will be magnetically locked.

It will be noted that the stop pin 24 and brackets 25 serve not only to prevent the rotary inertia element 14 from spinning with relation to disk 11 but serve also to limit the travel of cam 26 to a predetermined angle when the rotary inertia element 11 stops or decelerates abnormally.

By virtue of the mechanical operation of cam 26 and pilot valve 28 resulting whenever the rotary disks 11 and 14 get out of step with each other it is unnecessary to make any changes in the conventional brake system other than the installation of pipe connection 39 running from brake cylinder 9 to inlet opening 35; and all other parts and instrumentalities of the slide control mechanism may be incorporated and housed within the unit attached to the wheel axle and its journal box.

Although I have described one example of my invention in some detail, it will be apparent, especially to those skilled in the art, that various modifications may be made in the form of the slide control device as herein described and illustrated, and that certain features of the invention may be used to advantage without the use of other features, all without departing from the spirit of the invention as defined in the annexed claims.

Having thus described my invention, I claim:
1. A slide control device for a wheel comprising a control valve having a stem extending to the vicinity of the wheel axle and disposed coaxially therewith, a rotary disk positively driven by said wheel axle, a rotary inertia element mounted adjacent to said disk for free rotation, said disk and rotary inertia element having magnetic means whereby the inertia element derives its motion from magnetic attraction between it and said disk, said attraction being sufficient to cause said rotary inertia element to rotate at the same speed as said disk under normal conditions of acceleration and deceleration, a mechanism for actuating said control valve under conditions of excessive deceleration including a shaft geared to one of said rotary elements and carried in bearings affixed to the other rotary element, whereby said shaft is caused to revolve within its bearing only when a change occurs in the relative speed of rotation of said rotary elements, and a mechanical connection between said shaft and valve stem whereby the revolution of said shaft within its bearings causes an opening or closing movement of the control valve.

2. A slide control device for a wheel comprising a control valve having a stem extending to the vicinity of the wheel axle and disposed coaxially therewith, a rotary disk positively driven by said wheel axle, a rotary inertia element mounted adjacent to said disk for free rotation, said disk, and rotary inertia element having magnetic means whereby the inertia element derives its motion from magnetic attraction between it and said disk, said attraction being sufficient to cause said rotary inertia element to rotate at the same speed as said disk under normal conditions of acceleration and deceleration, and a mechanism for actuating said control valve under conditions of excessive deceleration including a shaft geared to one of said rotary elements and carried in bearings affixed to the other rotary element, whereby said shaft is caused to revolve within its bearings only when a change occurs in the relative speed of rotation of said rotary elements, a cam on said shaft engaging the stem of said control valve, and a spring for causing said valve stem to follow the motion of said cam.

3. A slide control device for a wheel comprising a control valve having a stem extending to the vicinity of the wheel axle and disposed coaxially therewith, a rotary disk positively driven by said wheel axle, a rotary inertia element mounted adjacent to said disk for free rotation, said disk and rotary inertia element having magnetic means whereby the inertia element derives its motion from magnetic attraction between it and said disk, said attraction being sufficient to cause said rotary inertia element to rotate at the same speed as said disk under normal conditions of acceleration and deceleration, and mechanism for actuating said control valve under conditions of excessive deceleration including a shaft carried in bearings affixed to one of said rotary elements and having a pinion thereon, and a rack carried by the other of said elements and engaging said pinion whereby the shaft is caused to revolve within its bearings only when a change occurs in the relative speed of rotation of said rotary elements, stop means limiting the relative angular movement between said rotary elements, and a mechanical connection between said shaft and valve stem whereby the revolution of said shaft within its bearings causes an opening or closing movement of the control valve.

4. A slide control device for a wheel of a railway vehicle comprising a control valve extending to the vicinity of the wheel axle and disposed coaxially therewith outside its journal box, a rotary disk positively driven by said wheel axle, a rotary inertia element mounted adjacent to said disk for free rotation, said disk and rotary inertia element having magnetic means whereby the inertia element derives its motion from magnetic attraction between it and said disk, said attraction being sufficient to cause said rotary inertia element to rotate at the same speed as said disk under normal conditions of acceleration and deceleration, and mechanism for actuating said control valve under conditions of excessive deceleration including a shaft geared to one of said rotary elements and carried in bearings affixed to the other rotary element, whereby said shaft is caused to revolve within its bearings only when a change occurs in the relative speed of rotation of said rotary elements, and a mechanical connection between said shaft and valve stem whereby the revolution of said shaft within its bearings causes an opening or closing movement of the control valve, said rotary elements, the control valve and means for actuating the control valve all being housed in a unit adapted for attachment to the journal box.

5. A slide control device for a wheel of a railway vehicle comprising a control valve extending to the vicinity of the wheel axle and disposed coaxially therewith outside its journal box, a rotary disk positively driven by said wheel axle, a rotary inertia element mounted adjacent to said disk for free rotation, said disk and rotary inertia element having magnetic means whereby the inertia element derives its motion from magnetic attraction between it and said disk, said attraction being sufficient to cause said rotary inertia element to rotate at the same speed as said disk under normal conditions of acceleration and deceleration, and means for actuating said control valve under conditions of excessive deceleration including a shaft geared to one of said rotary elements and carried in bearings affixed to the other rotary element, whereby said shaft is caused to revolve within its bearings only when a change occurs in the relative speed of rotation of said rotary elements, and a mechanical connection between said shaft and valve stem whereby the revolution of said shaft within its bearings causes an opening or closing movement of the control valve, said control valve consisting of a piston valve and pilot valve, and said rotary elements, piston valve pilot valve, and means for operating the pilot valve all being housed in a unit adapted for attachment to the journal box.

WILLIAM M. KELLER.

REFERENCES CITED

The following references are of record in the file of this patent:

UNITED STATES PATENTS

| Number | Name | Date |
| --- | --- | --- |
| 2,163,731 | Hallot | June 27, 1939 |
| 2,248,495 | Dupy | July 8, 1941 |
| 2,414,947 | Heinze | Jan. 28, 1947 |
| 2,415,344 | Eksergian | Feb. 4, 1947 |